United States Patent Office 3,465,296
Patented Sept. 2, 1969

3,465,296
PLURAL REGISTERS IN A CALCULATING
MACHINE
James John Drage and Alan Fripp, both of The Island,
Uxbridge, Middlesex, England
Filed Feb. 24, 1966, Ser. No. 529,778
Claims priority, application Great Britain, Feb. 26, 1965,
8,467/65
Int. Cl. G11b 13/00; G06f 7/00, 7/44
U.S. Cl. 340—172.5                                    7 Claims

ABSTRACT OF THE DISCLOSURE

A circuit for controlling the storage and transfer of numbers in and between a plurality of registers in a calculating machine. The control circuitry includes switches for activated selected ones of a plurality of gates to selectively apply pulses to a decade counter in accordance with the desired operation as determined by the individual switches. The decade counter provides control pulses which, in cooperation with a control pulse generated by the register to which numbers are being transferred to or from, serve to control the storage and transfer of numbers between the register units.

---

This invention has reference to calculating machine and the like register store units.

In application for U.S. Patent 3,296,425 there is described a calculating machine which is capable of performing arithmetic operations (addition, subtraction, multiplication and division). The machine described includes a plurality of stages of a register with associated number tubes. A train of pulses (up to ten) is entered into a first keyboard and subsequently a train of pulses (up to ten) is entered into a second keyboard and so on to change the setting of corresponding registers in turn. To perform addition, a number of pulses corresponding to the number to be entered into the register and for subtraction a number of electric pulses corresponding to the complement of the number of pulses to be subtracted, is added into the appropriate register. For multiplication, a switch is made on the machine keyboard representing the multiplication and a switch is made on another keyboard of the machine corresponding to one of the digits of the multiplier. A number of pulses is applied to each stage of the register to represent the number represented by the product so produced. This is repeated for each digit of the multiplier whereby the product is indicated on the number tubes of the machine. For division, the dividend is entered into the register and has the divisor subtracted from it a number of times until the number in the register becomes negative, whereupon the number being subtracted is again added back into the register. The answer representing the number of times the effective subtraction is made, is indicated on the number tubes.

In such a calculating machine it sometimes happens that it is desirable to perform an arithmetic operation as set out above, whereupon it is necessary to register the answer as by writing it down on a sheet of paper and then to perform a second arithmetic operation and use the answer obtained by the second arithmetic operation, for example by adding it to or subtracting it from the number obtained in the first arithmetic operation.

It is a principal object of the present invention to provide a register store unit which will be capable of receiving pulses from a calculating machine whereby numbers indicated on the calculating machine may be added into or subtracted from the register store unit and vice versa.

The present invention relates to a register store unit for a calculating machine of the kind having a plurality of registers into which electric pulses are applied in turn to effect arithmetic operations. According to the invention there is provided a plurality of memory registers, switch means to determine the kind of arithmetic operation to be effected, counting means to apply a number of pulses to the registers of the calculating machine to cause the registers thereof to count up to the number represented by the pulses, whereupon a controlling pulse is emitted and the registers are then counted back to their initial position. Additional switch means respond to the controlling pulse to control the passage of pulses supplied by the counting means into the memory registers in accordance with the determined operation.

One embodiment in accordance with the invention will now be described by way of example with reference to the accompanying drawings, wherein.

Figure 1A:
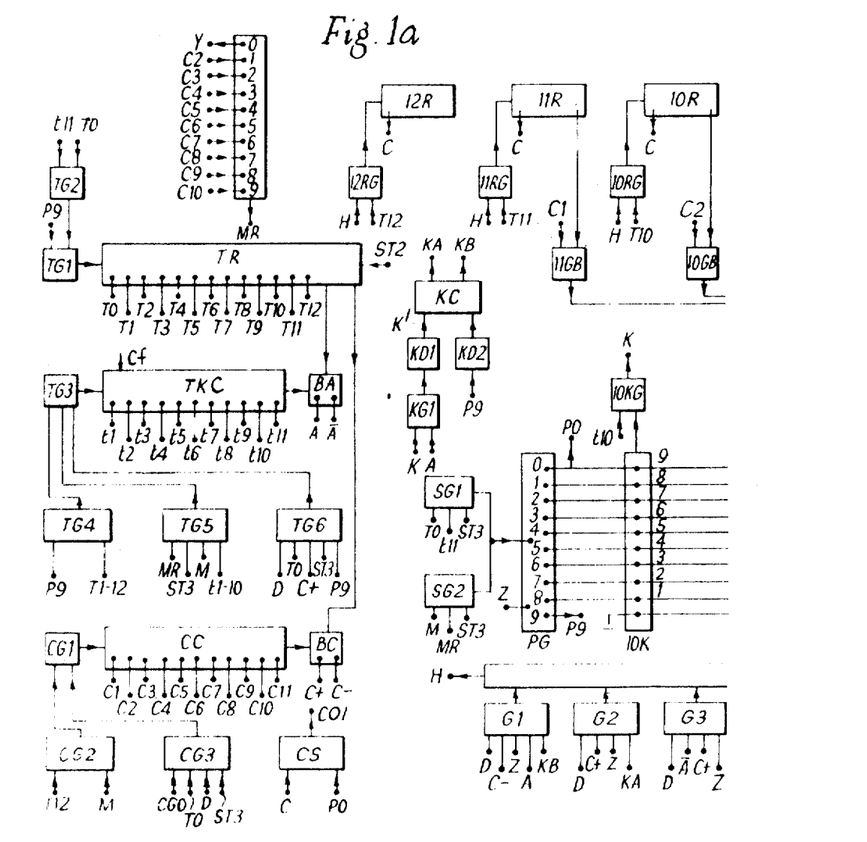
FIGURES 1a, 1b are circuit diagrams of a calculating machine similar to that described in U.S. Patent 3,296,425.
Figure 1B:
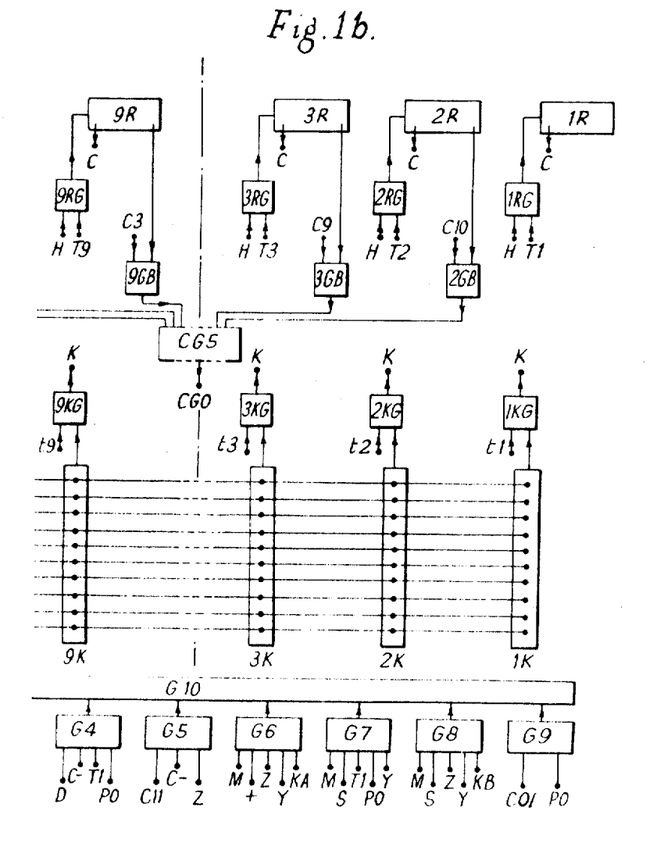

Referring to FIGS. 1a and 1b there is shown a keyboard with a series of orders of keys 1K, 2K . . . 10K and each order of keys is connected to a respective gate 1KG, 2KG . . . 10KG. A continuous train of pulses is applied to a counter circuit PG which applies these pulses in turn to the respective lines joining the orders of keys in sequence. That is to say, a first pulse P0 is applied to all the "9" keys and a second pulse P1 is applied to the keylines, but is employed for controlling the store register unit circuit as will be hereinafter described. This is illustrated in FIG. 2.

When a key on the keyboard is depressed, a circuit is made to the corresponding gate KG. For example, if the sixth key in the second order of keys 2K is depressed, each time a pulse P3 is emitted from the circuit PG, this pulse will be passed to the gate 2KG.

A train of pulses P9 applied to counter TKC are connected in turn to the connections $t1$, $t2$, $t3$, etc. These pulses applied to the connections $t1$, $t2$, $t3$, etc., are connected to the respective keyboard gates 1KG, 2KG, 3KG, etc., in turn. By this means an appropriate pulse is emitted from the gate 1KG, 2KG, 3KG, etc., at a time corresponding to the particular number in the particular order of keys. A connection through which a pulse K passes is made from each of the gates 1KG, 2KG, 3KG, etc., to another gate KG1 connected to a bistable device KC. The effect of this bistable device KC is to emit a voltage pulse KA and KB from the output thereof. KB gives a positive voltage pulse until receipt of a pulse K from one of the gates 1KG, 2KG, 3KG whereafter it emits a negative voltage, whereas the pulse KA gives off a negative voltage pulse until receipt of a pulse K from one of the gates 1KG, 2KG, 3KG whereafter it emits a positive voltage pulse. On receipt of the P9 pulse, the voltages return to their initial conditions.

Figure 2:
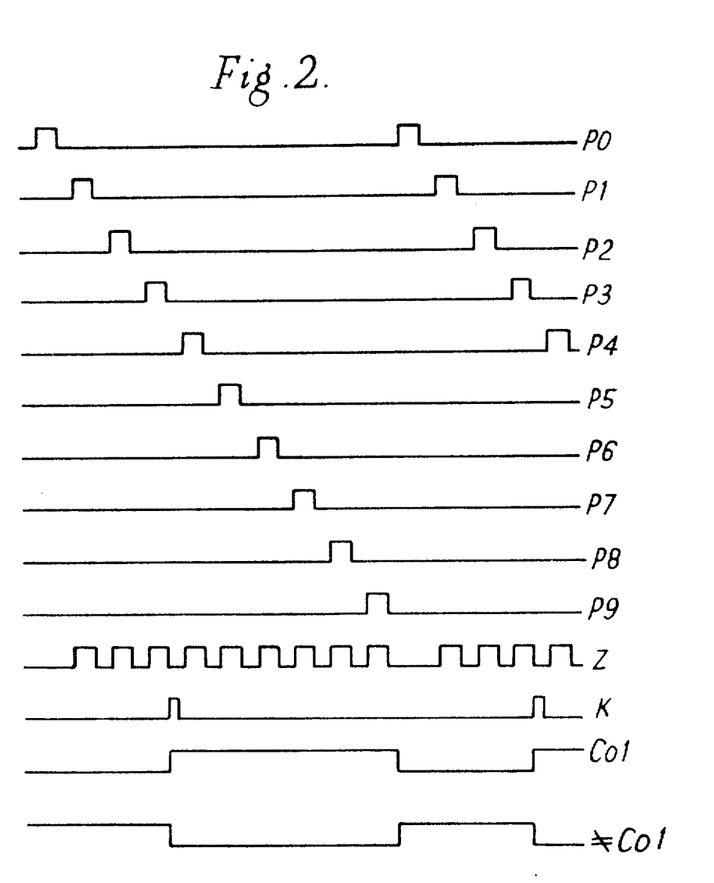
FIG. 2 is a diagram illustrating the pulses produced by the circuit shown in FIG. 1.

The pulses KB and KA are applied to respective gates G1, G2 and so arranged that these pulses change over the gates G1, G2 to permit a gated portion of the pulses Z (which comprise all the nine P0 to P9 pulses as shown in FIGURE 2) to be emitted to the gate G10 and transmitted out on a connecting line or highway H on receipt of the appropriate pulse from the gate 1KG, 2KG, 3KG. The highway H is also connected to the respective gates 1RG, 2RG, 3RG, etc., and each gate 1RG, 2RG, 3RG, etc. is in turn connected to a corresponding register 1R, 2R, 3R, etc. It will therefore, be apparent that if key number five of the second order of keys 2K is depressed then when a pulse is received on the corresponding line P4, this pulse will be passed to the gate 2KG and if a pulse to the connection $t2$, corresponding to the order 2K is received on the gate 2KG a pulse will be sent out onto the line as a pulse K and be connected to the bistable device KC. This will result in pulse KA, KB from the output of the bistable device, KA and KB being applied to the respective gates G1, G2. In the case of addition at the appropriate time a positive pulse KA is emitted and passed to the gate G2 and a series of pulses given off from the highway H and transmitted to the register stages 1R, 2R, 3R etc. so that the number 5 will be entered into the register stage 2 to add 5 to the number appearing in that register stage.

If one of the register stages 1R, 2R, . . . 12R has a number entered into it and so that when a further train of pulses is applied to the selected stage, that stage reads a number more than nine, a carry pulse will be emitted at the connection C. This carry pulse is emitted as the pulse is received to turn the stage from the ninth position to the zero position. The carry pulse is applied to the connection C of the carry store gate CS, to which gate CS the carry pulse is also applied at the connection P0. A pulse CO1 is given off from the gate CS. An illustration of this pulse is shown in FIG. 2.

When it is required to effect subtraction rather than addition, a complement of the number of pulses is transmitted to the appropriate register. This is achieved by means of the KB pulse which is transmitted to the gate G1, whereby a complement of the pulses for addition is transmitted to the selected stage of the register 1R . . . 12R. That is to say instead of transmitting the pulses after the K pulse is received, there is transmitted a series of pulses up to the time the pulse is received.

In order that multiplication may be effected, register TR is employed. This register TR is controlled to supply a pulse T1, T2, T3, etc. to the respective register gate 1RG, 2RG, 3RG whereby the pulses instead of being received at the appropriate time may be slipped with respect to the transmission from the lines 1K, 2K, 3K so as to accommodate for multiplication by 10, 100 or 1000.

The stepping of the pulses T1 . . . T12 of the register TR is controlled by a CF pulse applied to the CF connection of the keyboard timing counter TKC. This connection may also have the function of switching off the counter if a positive voltage is not applied.

Each stage 1R . . . 12R of the stage of the register shown in FIGS. 1a and 1b has associated with it a number tube (not shown in FIG. 1) to indicate the number being stored in the appropriate stage 1R . . . 12R of that register. Other parts of the circuit shown in FIGS. 1a, 1b are more fully described in U.S. Patent No. 3,296,425.

Figure 3A:
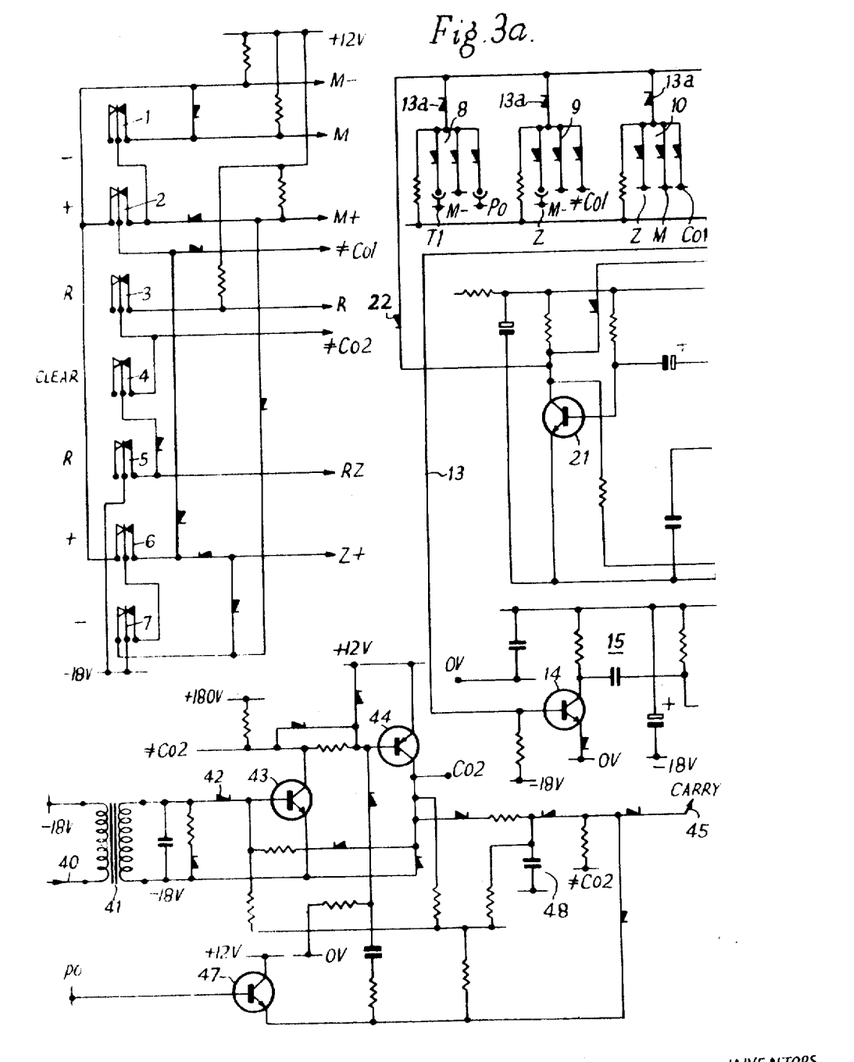
FIGS. 3a, 3b are circuit diagrams of a register store unit.
Figure 3B:
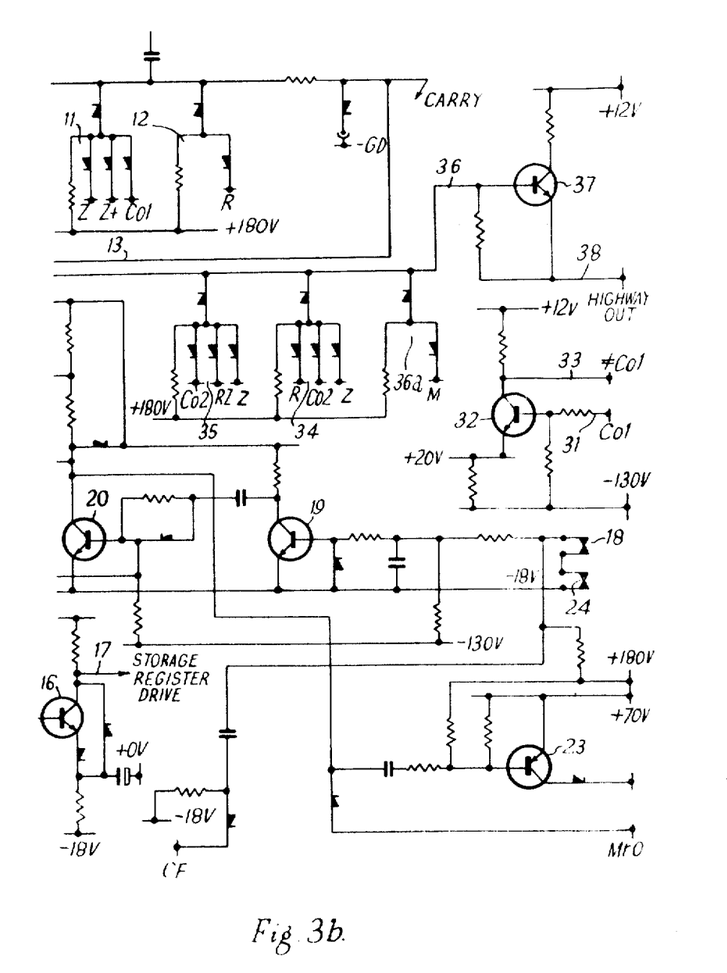

Referring to FIG. 3 the register store unit or store register is controlled by seven switches. These switches are shown in the drawings by the reference numbers 1 to 7. The switch 1 serves to subtract a number appearing in the register of the calculating machine from the number appearing in the register of the register store unit, the switch 2 serves to add to the number appearing in the register of the register store unit the number appearing in the register of the calculating machine, the switch 3 serves to read out to the register of the calculating machine the number appearing in the register of the register store unit without destroying the number in the register store unit. The switch 4 serves to clear the number recorded in the register of the register store unit and the switch 5 serves to read the number appearing in the register store unit, that is to say to make the number indicated on the memory unit appear on the register of the calculating machine and also serves to clear the number from the register of the memory unit. The switch 6 serves to add the numbers set up in the register of the calculating machine into the register of the register store and to clear the number set up in the register of the calculating machine. The switch 7 serves to subtract the number set up on the calculating machine from the number set up in the register store unit and to clear the calculating machine register unit. Each of the switches 1 to 7 in its normal position connects a minus 18 v. negative voltage through the lines M−, M, M+, R, RZ, or Z+ to the appropriate connection of "And" gates 8, 9, 10, 11, 12, 34, 35 and 36a. This negative voltage is released by operation of the appropriate one of the keys 1 to 7. The switches 2 and 6 have normally unmade contacts connected to a line M− so that on operation of either of these switches (2, 6) the −18 volts supply is maintained to the line M− and hence to the gates 8 and 9. The switches 6 and 7 are connected so that so long as they are in their rest position the −18 voltage is connected to the line Z+ and hence to the gate 11 as well as to the ≠CO1 line. The switch 5 normally connects the −18 volt supply to the RZ line and thence to the gate 35. Likewise the −18 volt supply is normally connected through the switches 5, 4 and 3 to the line R. The −18 v. is also connected through the switches 5 and 4 to the ≠CO2 line. Furthermore, the −18 volt supply is connected to the line M+ through the switches 7, 6 and 2 and to the line M through the switches 7, 6, 2 and 1.

A +12 volt supply is connected through resistances to the line M−, the line M, the line M+ and the line R so that on release of the −18 volt voltage the line will receive a positive bias.

So long as the −18 v. voltage is connected to the appropriate gates 8, 9, 10, 11, 12, 34, 35 and 36a, these gates will be switched off. Release of the −18 volt voltage will permit the gates to open. The gates 8, 9, 10, 11 and 12 are connected to a line 13 so that opening of the appropriate gate will permit pulses to pass to the line 13. The line 13 is in turn connected to the input transistor of a write amplifier circuit 15. This amplifier circuit includes a second transistor 16 having an output 17. The output is connected to the input circuit 52 of a storage register made up of a plurality of decade counter circuits each having a plurality of binary circuits 61, 66, 69, 70 (FIG. 4) to be hereinafter described.

Each of the "And" gates 8, 9, 10, 11, 12, 34, 35 and 36a consists of one or more rectifiers in parallel with a resistance which is also connected to a +180 volts supply. The gate 8 has three rectifiers, the first one is connected to a supply whereby the pulse T1 given off from the timer register TR circuit (FIG. 1) is applied to the gate. The second rectifier is connected to the M− connection from the switch 1 and a third rectifier is connected to a supply for the pulse P0 from the keyboard (FIG. 1). The gate 9 has a first rectifier connected to the output of the 9 pulses (Z) transmitted from the keyboard (FIG. 1) and a second rectifier is similarly connected to the M−− connection of switch 1. A further rectifier is connected to a pulse (≠CO1) to be hereinafter described. The gate 10 has a rectifier connected from the supply of Z pulses (FIG. 2) and the second rectifier connected to the connection M+ of the switch 2. There is also a connection for the pulse CO1 (to be hereinafter described). The gate 11 has a connection from the supply of Z pulses (FIG. 2), another rectifier is connected to the Z+ output of the switch 6 and a further rectifier to the CO1 output from FIG. 1. The gate 12 has a rectifier connected to the output R of the switch 3.

Each of the gates 8, 9, 10, 11 and 12 are connected in series with a respective rectifier 13a, and each of these rectifiers connected to the gates are connected in parallel to the line 13.

It will be apparent that the gate 8 when open will pass a pulse P0, to the line 13. Likewise a train of pulses (or part of a train of pulses (Z)) will pass through the gates 9, 10, 11 when open to the line 13. This occurs when there are no negative voltages applied to the other connections of the gates.

The line 13 is also connected to a continuous supply of pulses —GD which comprises a continuous train of pulses like pulses Z, but with no gap between the group of ten pulses.

The line 13 is connected to the base connection of a transistor 14 and the collector of this transistor 14 is connected in turn to the base of a second ransistor 16 and these transistors together constitute an amplification circuit 15. The collector of the transistor 16 is connected to the input of a series of register circuits, each of which consists of a decade counter circuit (to be hereinafter described) through the connection 17.

A pair of contacts are associated with the switches 1 to 7 so that on operation of any one of the switches 1 to 7 the contacts 18 are also operated. The pair of contacts 18 are connected to the amplifying transistor 19 which in turn is connected to the pair of transistors 20, 21 which together form a monostable circuit and the output of this monostable circuit is connected through the rectifier 22 to the line 13. The function of the switch 18 and the monostable circuit is to serve as a switching on circuit to permit the negative potential to be taken from the line 13 through the rectifier 22 to permit the circuit consisting of the gates 8, 9, 10, 11 and 12 to become operative. Opening of the switch 18 also serves to release the —18 volts generating a pulse from the connection CF to the timer keyboard circuit TKC (FIG. 1) as well as to pass a signal to the transistor 23 which serves to initiate operation of the calculating machine.

A pair of switch contacts 24 being part of a repeat switch are connected in series with the switch 18 and serves a similar function.

An input connection 31 from the carry store CS (FIG. 1) receives a pulse CO1 which is referred to as CS0 in U.S. Patent No. 3,296,425 and this pulse is connected to the base connection of a transistor 32 which serves as an amplifying complementor circuit. An envelope pulse as indicated at CO1 (FIG. 2) is applied to the input CO1 and this produces on the output 33 an envelope pulse as illustrated at ≠CO1 (FIG. 2). This output envelope pulse ≠CO1 is a complement of the envelope pulse CO1 applied to the input 31.

The connection R on the switch 3 is made to an "And" gate 34 to which input connections are also made from a carry pulse CO2 (to be hereinafter described) and from a series of pulses Z (FIG. 2) generated from the calculating machine. Similarly, the connections RZ from the switch 5 is made to "And" gate 35 in parallel with the gate 34. Inputs are also applied to the gate 35 from the connection from the carry CO2 and from the series of pulses Z. The output 36 of the gates 34, 35 in parallel is connected to a current amplifying transistor 37. The output 38 of this amplifier is connected to the highway line H in the calculating machine. A gate 36a is also connected to the output 36. The gate has an input connected to the M connection of the switch 1.

To accommodate for those conditions where it is necessary to generate a carry pulse CO2 and a complementary pulse ≠CO2 there is provided a carry store circuit which includes an input 40 to receive carry pulses K from the output 74 of the decade counter circuit (to be hereinafter described). This input is connected to a transformer 41 and through the rectifier 42 to a transistor 43. The pulses are passed from the transistor 43 to the transistor 44 which serves to supply an envelope voltage output from the output CO2. It also serves to provide at the output ≠CO2 a voltage output which is the complementary voltage to the voltage CO2. It is also arranged that a carry pulse is given off from the output 45 which is connected to the line 13 being the output from the gates 8–12 and acts as a carry-over pulse for entry into the register store unit.

This carry pulse is arranged to be passed at a period of time when no other pulses are being passed and this is attained by passing a pulse (PO) to the transistor 47 which is passed to the gate 48 prepared by the carry over condition so that on receipt of the pulse and if the carry over condition agrees, a carry pulse is passed to the line 13.

Figure 4:
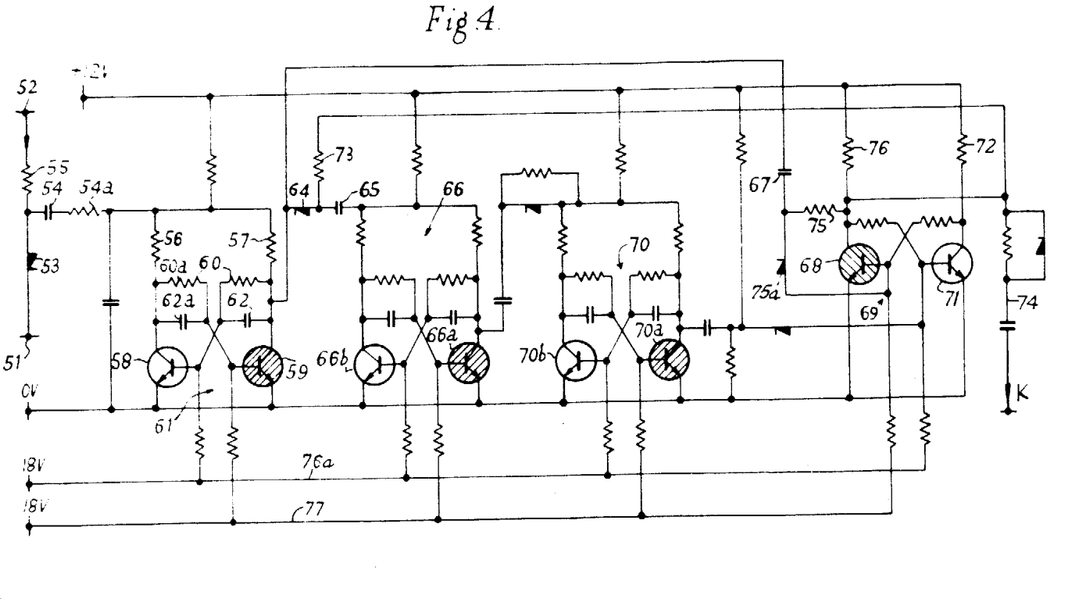
FIG. 4 is a circuit diagram of a decade counter circuit for use in conjunction with the register store circuit of FIGS. 3a, 3b.

Referring to FIG. 4 there is shown a decade counter circuit which includes a pair of input circuits 51, 52, which together form an "And" gate. The input circuit 51 is connected to a supply of a train of pulses, some of which are to be counted and some of which are to be ignored. The input circuit 52 is the input which determines whether the pulses applied to the input 51 are to be counted or not and this input is connected to the output 17 (FIGS. 3a, 3b). It is arranged that when a positive potential is applied to the input 52 the pulses applied to the input 51 are passed into the circuit, otherwise no pulses are allowed to pass into the circuit. The input 51 includes a rectifier 53 connected to one plate of a condenser 54. The input 52 includes a resistance 55 also connected to the said one plate of the condenser 54. The other plate of the condenser 54 is connected through a resistance 54a and to a pair of resistances 56 and 57 in parallel, which resistances are respectively connected to a respective collector of a pair of n.p.n. transistors 58 and 59. The collector of each transistor is connected through a resistance 60 to the base of the other transistors 59, 58. A respective condenser 62 is connected in parallel with the resistances 60. The resistance 60a and condenser 62a in parallel are connected to the base of the transistor 59. The transistors 58 and 59 with the associated resistances and condensers constitute a first binary counting circuit 61. The collector of the transistor 59 is connected through a rectifier 64 and condenser 65 with a second binary circuit 66, similar to the binary circuit 61 incorporating the transistors 58 and 59. The collector of the transistors 59 is also connected through a condenser 67 to a further binary circuit 69 to be hereinafter described.

The rectifier 64 forms with a condenser 67 and other components to be hereinafter described, an "And" gate which either permits pulses emitted from the binary circuit 61 to be passed from the circuit of the transistor 59 either to the binary circuit 66 or the binary circuit 69.

The binary circuit 66 includes a pair of transistors 66a, 66b and which are connected in a similar fashion to the binary circuit 61. The collector of the transistor 66a is connected to the input of a further binary circuit 70. Thus, alternate pulses applied to the binary circuit 61 are passed either to the binary circuit 66 or to the binary circuit 69. Alternate pulses transmitted to the binary circuit 66 are in turn transmitted to a similar binary circuit 70 connected in cascade with the binary circuit 66 including transistors 70a and 70b.

The binary circuit 69 includes two transistors 68 and 71 and the collector of the transistor 68 is connected through a resistance 73 to the gate including the rectifier 64. It is arranged that the first alternative pulse from the binary circuit 61 is passed to the binary circuit 69. This causes the binary circuit 69 to change its condition, namely that the transistor 68 ceases to conduct and the transistor 71 conducts. This causes a feedback voltage to be applied across the resistance 73 connected between the rectifier 64 and the condenser 65, thereby to ensure that further alternate pulses emitted from the binary circuit 61 are passed to the binary circuit 66 rather than to the binary circuit 69.

The collector of the transistor 68 is connected also to an output circuit 74 so arranged that when this transistor conducts a carry pulse K (FIG. 2) is transmitted through the ouput circuit 74 and then to the input 40.

In operation and assuming that the transistors 59, 66a, 70a and 68 of the binary circuits 61, 66, 70 and 69 respectively, are conducting (which constitutes the zero condition) a series of pulses will be received on the input 51. Because no positive voltage is applied to the input 52 and hence since the resistance 55 is not conducting, current in the form of pulses will not be allowed to pass through the rectifier 53. However, when a positive voltage in the form of an envelope is applied to the input 52 the resistance will start conducting which will result in a raising of potential on the infeed plate of the condenser 54 and this will permit current to pass through the rectifier 53 and allow pulses to pass to the infeed plate of the condenser 54. Because the condenser 54 is of relatively high value this condenser will charge up slowly, but as soon as the end of the transmission of the pulse from the input 51 is reached the charge on the condenser will be changed quickly to cause a negative pulse to be applied to the resistance 54a and be fed to the resistances 56 and 57 in parallel. At that time the transistor 59 is conducting and there will be a drop in potential across the resistance 57 and across the resistance 60a and condenser 62a in parallel, but none across the resistance 56. Hence, application of a negative pulse to the infeed side of the resistance 56 will be applied to the base of the transistor 59 which will stop this transistor from conducting, but the potential is retained across condenser 62a. For a short period of time neither of the transistors 58, 59 will conduct, but on release of the negative pulse and because the voltage is still retained across the condenser 60a the potential on the base of the transistor 59 is lower than the potential on the base of the transisor 58. At this stage the negative potential is released from the collector of transistor 58. Because the potential on the base of the transistor 59 is lower than the potential on the base of the transistor 58, on release of the negative potential the transistor 58 will start conducting. Likewise, when the transistor 58 starts to conduct the potential across the resistance 56 will be built up which will lower the potential at the outfeed side of the resistance 56 and this will be passed to the base of the transistor 59 and serve as a bar to its conducting. It will be apparent that each time a pulse is applied to the transistors 58 and 59 the transistor previously conducting will cease to conduct and vice versa. It will be apparent that each time the transistor 59 starts to conduct (that is each alternate time a pulse is received by the binary circuit 61) a negative pulse will be sent out from the collector and passed either to the binary circuit 66 or the binary circuit 69. On emission of the first pulse from the binary circuit 61, because the transistor 68 is conducting, there is a voltage across the resistance 76 and hence the voltage on the collector of the transistor 68 is lowered. This is passed through the resistance 73 to the outfeed side of the rectifier 64 so that the pulse received from the transistor 59 cannot pass through the rectifier 64. Hence, the pulse passes to the condenser 67 and through the rectifier 75a which serves with the resistance 75 as an "And" gate to the base of the transistor 68 to stop the transistor conducting and on receipt of the end of the pulse to start the transistor 71 conducting.

On receipt of the second alternate pulse, because the transistor 68 is then no longer conducting, there is no voltage drop at the outfeed of the rectifier 64 and hence pulses can pass through the rectifier to the binary circuit 66. In like manner when the binary circuit 66 changes its state this will serve to transmit alternate pulses to the binary circuit 70. Thus it will be seen that the transistors will conduct as set out in the attached table, wherein the figure zero implies that the transistor 59, 66a, 70a or 68 is conducting and the figure 1 implies that the transistor 59, 66b, 70b or 71 is conducting:

| Pulses | State of count of binary circuit | | | |
|---|---|---|---|---|
| | 61 | 66 | 70 | 69 |
| 0 | 0 | 0 | 0 | 0 |
| 1 | 1 | 0 | 0 | 0 |
| 2 | 0 | 0 | 0 | 1 |
| 3 | 1 | 0 | 0 | 1 |
| 4 | 0 | 1 | 0 | 1 |
| 5 | 1 | 1 | 0 | 1 |
| 6 | 0 | 0 | 1 | 1 |
| 7 | 1 | 0 | 1 | 1 |
| 8 | 0 | 1 | 1 | 1 |
| 9 | 1 | 1 | 1 | 1 |
| 10 | 0 | 0 | 0 | 0 |

It will be seen from the above that the circuit counts up to 10 whereupon it resumes its zero condition.

The collector of the transistor 68 is connected to the output circuit 74 so that when the zero condition is reached a pulse CO1 is applied to this output circuit and passed to the input 40 (FIG. 3). It will also be apparent that when it is required to count a number and the circuit is set to any pre-determined number, for example 3, then at the application of 7 additional pulses an output pulse will be applied to the circuit 74.

When it is required to restore the counter circuit to its zero condition, this may be achieved by applying a negative potential to the line 76 or a positive potential to the line 77.

Alternatively, it may be arranged that a number of pulses are applied to the circuit and so arranged that the supply of these pulses is cut off as soon as the output pulse is passed to the output circuit 74. An additional input gate (not shown) is supplied for this purpose.

In operation it will be apparent that depression of any one of the keys 1–7 causes the contacts 18 to open. Opening of this switch 18 causes the negative pulse to be released from the line 13 and sends out a pulse through the connection CF to the calculating machine.

When it is required to add the numbers indicated on the register having stages 1R . . . 12R of the calculating machine into the register store unit, the key 2 is depressed. This releases the —18 volt potential from the connections M and M+. By virtue of the connection of the stages 1R . . . 12R the registers of the calculating machine are addressed in turn, that is to say ten pulses are applied to each stage in turn to restore that stage to its starting condition. However, as each register stage 1R . . . 12R passes through zero condition a pulse is given off which applied to the CO1 input of the gate 10 which serves to open this gate. From then onwards the number of pulses which are required to restore the calculating machine register stages to their initial position are counted into the store unit. These pulses are passed through the line 13 to the transistor 14 and hence the transistor 16 from where they are transmitted from the output 17 to the input 51 of the decade counter register of the register store unit. Each of the decade counter units is addressed in turn and by virtue of the connection CF, the numbers in the stages of the calculating machine registers are added into stages of the register store unit. It will be seen that the number entered into the decade counter register is added into the number already in the calculating machine register stages 1R . . . 12R. If a number is already in a stage of register unit whereby the number added to it causes that number to pass through zero, a carry pulse CO2 will be transmitted and given off and passed to the gate 48 so that on receipt of a pulse P0 at the input to the transistor 47 a pulse is applied to the gate 48 and through the line 13 to the amplification circuit 15 from there it is applied to the line 17 to count in the next register counting operation. Thereby a carry to the next higher register stage is obtained.

When it is required to effect the subtraction of the number entered into the register stages 1R ... 12R of the calculating machine, the switch 1 is depressed, and this serves to release —18 volt negative potential at the connection M— of the gate 9. Hence, when the pulses are transmitted from the calculating machine, these pulses are allowed to pass into the line 13 until the carry pulse ≠CO1 is terminated from the calculating machine. When the pulse is received, the gate 9 is closed, which prevents further pulses being entered. These pulses are added into the register store unit through the line 13 in a manner similar to that as described above. However, it will be apparent that the number of pulses passed before the receipt of the carry pulse is equivalent to entering the complement of the number added. In other words this corresponds to subtracting the number in question. In a similar manner to that described in connection with the addition, the decade counter register store unit stages are addressed in sequence.

In a subtraction operation a single pulse P0 is also passed through the gate 8 to correct the error introduced by using the 9's complement in a subtraction operation.

When it is required to read the number set up in the register unit store, the key number 3 is depressed, which serves to release an 18 volt negative potential from the connection R of the gate 34. It also releases the —18 volt potential from the gate 12 which serves to pass pulses in trains of 10 pulses to the line 13 from the supply GD. This serves to allow pulses to enter into the stages of the register store unit as they are received, but as soon as a carry pulse is received at the point CO2 this will open the gate 34 and allow pulses of the supply of ten pulses after the zero condition, i.e. after the pulse CO2 is entered into the calculating machine register. The respective stages of the register store unit are transferred in turn into the calculation register. Because ten pulses are applied to the store register stages the original number entered in the store register is maintained.

When it is required to clear the number entered on the register store unit, the switch 4 is depressed. Operation of this switch serves to disconnect the —18 volt potential from the ≠CO2 line and this has the same effect as operating the switch 3, except that when the zero position is reached the received pulse ≠CO2 serves to cut off the supply of pulses to the line R to close the gate 34 and prevent the pulses being supplied to the register of the register store unit. The train of pulses are continued to be supplied to the register of the calculating machine to cause the stages 1R ... 12R of the register to be returned to their initial condition.

When it is required to read the number entered in the register store unit into the calculating machine and clear it from the register store unit at the same time, the switch 5 is depressed. Operation of the switch 5 has the effect of disconnecting the —18 volts potential from the line RZ, which line RZ is connected to the gate 35. This will have the effect of counting out the number of pulses entered in the register into the calculating machine as described in connection with operation of the key 3, but as soon as the pulse ≠CO2 ceases to be applied through the switch 3 to the line R this will have the effect of closing the gate 12 to prevent any more pulses being fed to the register store unit. Hence, the registers in the register store unit will all be zeroed, the contents of the register store having been entered into the calculating machine.

In like manner when it is required to add the amount appearing in the calculating machine register into the register store unit, but to zeroise the registers of the calculating machine, the switch 6 is depressed, which has the effect of disconnecting the —18 volt potential from the line Z+ connected to the gate 11 and remove —18 from gate 36a. This will have the effect of counting out the number of pulses recorded on the calculating machine, but as soon as the carry pulse CO1 is received the gate 11 is opened, but gate 36a cuts off the supply of further pulses to the stages of the register of the calculating machine and thereby ensures that the stages of the register of the calculating machine remain at the zero condition.

Operation of the key 7 serves to deduct the amount appearing on the registers of the calculating machine from the amount appearing in the register store unit, but also zeros the register in the calculating machine. This is performed by operation of the key 7 which causes the —18 volt supply to be released from the lines M and M— therefore performs the same operation as the key 1. Pulses received after the zero pulse cannot pass through the gate 36a. This is because the ≠CO1 pulse is no longer applied to the switches 1 and 2 which thereby causes the supply of voltage to the lines M and M—— to be cut off the line M and hence cut off the gate 36a and hence prevent any further pulses being received by the calculating machine register.

What we claim is:

1. A calculating machine including first register means providing arithmetic calculation and storage of the resultant answer to the arithmetic calculation, comprising:
    said first register means including a plurality of stages for receiving sequential pulses,
    second register means for storing pulses and including a plurality of stages corresponding to the stages of said first register means,
    switching means for selecting one of the first or second register means,
    decade counting means to sequentially apply a number of pulses to the stages of the selected register means to change the information stored in the selected register stages thereof in accordance with the number of pulses applied thereto,
    means for detecting the zero transition of the information stored in each stage and to emit a controlling pulse to indicate the transition of information in each stage through zero,
    said switching means coacting with said controlling pulse to control the passage of pulses into the stages of the non-selected register whereby the numbers stored in the stages of the non-selected register are changed in accordance with the numbers originally entered in the corresponding stages of the selected register.

2. A calculating machine according to claim 1 wherein the stages of said first and second register means are decade stages, and further comprising a plurality of gates to receive signals from the switch means and the controlling pulses from the selected register to control the passage of pulses into the non-selected register.

3. A calculating machine according to claim 2 wherein said switching means activates at least one of the gates to control the passage of pulses emitted by the decade counting means to effect subtraction of these pulses with the information stored in the selected register means, said subtraction being effected prior to the emission of said controlling pulse.

4. A calculating machine according to claim 2 wherein said switching means activates at least one of the gates to control the passage of pulses emitted from said decade counting means to effect subtraction of these pulses from the information stored in said selected register means, said subtraction being effected subsequent to the emission of said controlling pulse.

5. A calculating machine according to claim 2 wherein said switch means comprises a plurality of manual switches, each manual switch being selected to effect a predetermined arithmetic calculation by controlling the activation of said gates to control the passage of pulses to said selected register.

6. A calculating machine according to claim 5 wherein at least one of said manual switches effects control of the non-selected register to restore the stages thereof to a zero condition.

7. A calculating machine according to claim 5 wherein at least one of said manual switches effects control of the non-selected register to restore the stages thereof to an initial condition.

References Cited

UNITED STATES PATENTS

| 2,930,529 | 3/1960 | Laboissiere | 235—160 |
| 2,951,636 | 9/1960 | La Pointe | 235—92 X |
| 3,166,668 | 1/1965 | Marsh | 340—172.5 |
| 3,160,857 | 12/1964 | Frush | 340—172.5 |
| 3,161,765 | 12/1964 | Hoberg et al. | 235—92 X |

OTHER REFERENCES

Sperry Rand Corp., Univac 1107 Memory Computer, 1961, p. 7.

ROBERT C. BAILEY, Primary Examiner

P. R. WOODS, Assistant Examiner

U.S. Cl. X.R.

235—160